June 23, 1959     R. R. DAHL ET AL     2,891,578

FLOW CONTROL DEVICE

Filed Jan. 9, 1956

Inventors
ROBERT R. DAHL
HOWARD L. ERICKSON by Hill, Sherman, Meroni, Gross & Simpson Attys.

United States Patent Office 2,891,578
Patented June 23, 1959

2,891,578

FLOW CONTROL DEVICE

Robert R. Dahl and Howard L. Erickson, Chicago, Ill., assignors to The Dole Valve Company, Chicago, Ill., a corporation of Illinois Application January 9, 1956, Serial No. 558,088

1 Claim. (Cl. 138—45)

This invention relates to improvements in flow control devices for maintaining a substantially constant rate of fluid flow over a wide range of pressure variations.

Flow control devices in the forms of resilient annuluses reacting against a seat have come into quite common use for controlling the flow of liquids and particularly water at household pressures. While such flow control devices have gained a wide acceptance, at low pressure they have provided too much restriction to flow, so that the desired flow rate was not maintained when the water supply pressure became too low.

In carrying out our invention we remedy this deficiency in the control of the flow at the low pressure conditions by providing a taper in the orifice of the flow control device, tapering outwardly from the upstream to downstream side thereof at a relatively flat angle.

It is accordingly a principal object of our invention to provide a resilient flow control device so constructed and arranged as to improve the flow characteristics of the device, particularly at the point where the pressure passing through the washer or flow control device may drop off.

A further object of the invention is to provide a flow control device in the form of a resilient annulus in which the flow at low pressure conditions is made more uniform than formerly with a decreased drop off in flow at such pressure conditions.

A further object of the invention is to provide a more accurate resilient annular flow control device in which the contour of the seat for the device has no effect on the flow control characteristics of device, and in which the efficiency of the control of the flow is increased by tapering the orifice of the flow control device outwardly from the inlet to the outlet end thereof.

These and other objects of the invention will appear from time to time as the following specification proceeds and with reference to the accompanying drawings wherein.

Figure 1:
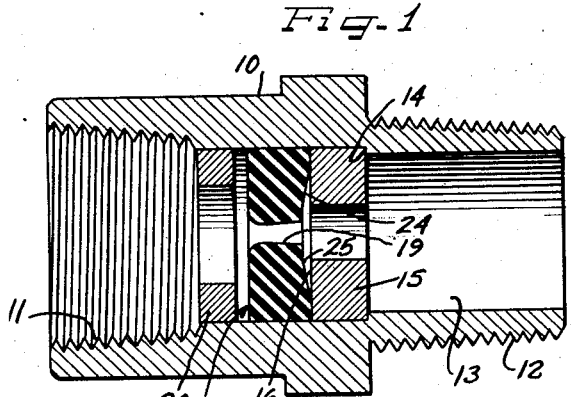
Figure 1 is a cross-sectional view taken through a fluid flow passageway, showing a flow control device constructed in accordance with our invention in the passageway with no fluid pressure on the flow control device.
Figure 3:
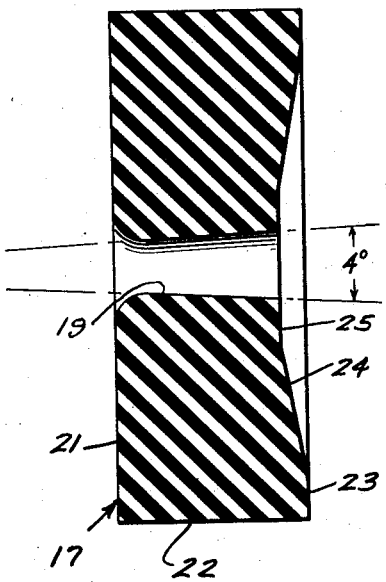
Figure 3 is an enlarged sectional view taken through the flow control device.
Figure 2:
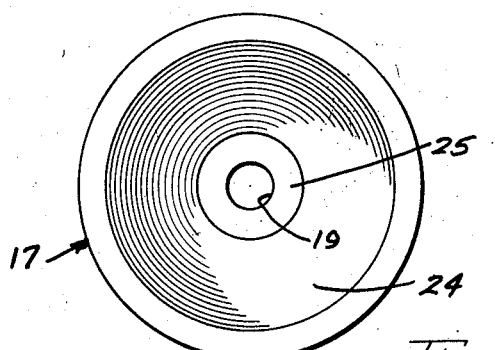
Figure 2 is a plan view of the flow control device looking at the device from the downstream side thereof.

In the embodiment of the invention illustrated in the drawing, we have shown in Figure 1 a cross-section taken through a fitting or hollow housing 10 of a type adapted to be connected in a fluid conduit or the inlet or outlet of a valve and the like. The housing 10 is internally threaded at its inlet end as indicated by reference character 11 for threaded engagement with a fitting or pipe, and is externally threaded at its discharge end as indicated by reference character 12, to be threadedly received within a valve body or fitting or the like.

The interior wall of the housing 10 on the downstream side of the threaded portion thereof forms a flow passage 13 for fluid, such as water, and is shown as having a shoulder 14 therein abutted by a rigid annulus or collar 15 seated against the shoulder 14 and having a flat seating surface 16 forming a shoulder or seat in the passageway 13 against which an annular flow control device 17 reacts, to control the flow of fluid through the housing 10 and to maintain the flow relatively uniform over a wide range of pressure variations.

The flow control device 17 controls the flow of fluid by flexing or bending inwardly upon increases in pressure to reduce the cross-sectional area of a central orifice 19 leading therethrough, as the pressure increases, on the same general principles as are disclosed in Patent No. 2,454,929, which issued to L. A. Kempton on November 30, 1948.

The particular flow control device 17 embodies the improvements shown and described in a copending application Serial No. 389,210 entitled, "Flow Control Structure," filed by Robert R. Dahl on October 30, 1953, now Patent No. 2,775,984.

The flow control device may be made from a resilient or elastic material, such as rubber or one of the well known substitutes for rubber, such as "neoprene" and the like, of such elasticity as to be readily flexible in a downstream direction upon increases in pressure of the fluid acting on the upstream face thereof and to return to its initial position upon reductions in pressure thereon.

Spaced in an upstream direction from the upstream face of the flow control device 17 is a retaining ring 20 which may be a press fitted insert or the like. The retaining ring 20 is spaced from the flow control device 17 a sufficient distance to accommodate some freedom of movement of the flow control device within the housing 10, but sufficiently close to said flow control device to maintain the flow control device in position to engage its seat upon the flow of fluid through the housing.

The flow control device 17 is shown as having a flat face 21 on the upstream side thereof converging in a uniform curve into the orifice 19 leading through the device and providing a uniformly smooth orifice for all degrees of flexure of the flow control device. The flow control device also has an outer wall 22 loosely fitting within the passageway 13 in the interior of the housing 10 and a downstream face 23 seating against the flat seating surface 16 adjacent its periphery and contoured inwardly in the form of a flat angled frustum of a cone as indicated by reference character 24. The frustoconical recess surface 24 terminates into an annular surface 25, shown in Figure 1 as being parallel to the face of the seat 16 and terminating at the outlet end of the orifice 19 in the form of a clean sharp edge.

The diameter of the orifice 19 may be varied for varying flow conditions provided it is not larger in diameter than the diameter of the passageway through the collar 15. As herein shown, the orifice 19 tapers outwardly from the inlet to the outlet end thereof at an angle which is herein shown as being four degrees, but the taper included may be of various other angles, best results usually occurring when the angle is between two degrees and six degrees, with lesser improvements over non-tapered orifices occurring when the angle of the taper is between one and two and between six and nine degrees.

Figure 4:
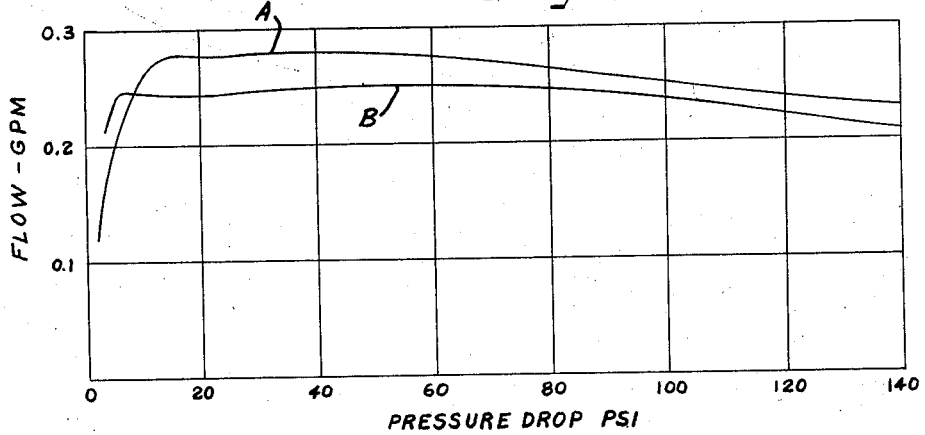
Figure 4 is a graph showing comparative curves of two flow control devices of the same general design, one of which has a tapered orifice in accordance with the teachings of the present invention, and the other of which has a non-tapered orifice of a diameter equal to the smallest diameter of the tapered orifice.

In Figure 4 we have shown comparative curves for two similar flow controls, curve A being a flow performance curve of a flow control device like that shown in Figure 1 except that the orifice has no taper.

Curve B, however, is a flow performance curve of a flow control device having an orifice tapered from the inlet to the outlet end thereof at an included angle of four degrees.

It may be seen from a comparison of curves A and B that the flow control performance of the flow washer without a tapered orifice indicated by curve A is much poorer than that of the flow washer indicated by curve B, in which the washer tested has a four degree tapered orifice. Curve A shows that the flow washer does not come into its rated flow range until the pressure drop across the washer is seventeen pounds per square inch. The flow from seventeen pounds to sixty pounds is then substantially uniform until the pressure drop across the orifice through the washer flow control device reaches sixty pounds per square inch, at which time the flow gradually drops off.

In curve B taken from tests made of a flow washer of the same design as the flow washer from which the curve A was taken, but having a tapered orifice, the taper of which is four degrees, the flow washer reaches its rated flow at a pressure drop of substantially six pounds per square inch and the flow is maintained substantially uniform until the pressure drop reaches eighty pounds per square inch, at which time the flow gradually drops off.

It will be noted from a comparison of curves A and B that the taper has the effect of reducing the rated flow rate. However, the tapered orifice could be made larger to increase the rated flow rate, and this would further improve the flow at low pressures.

The difference in the pressure drops at which the respective flow washers reach their rated flow rates may appear small in comparison to the total pressure drop range, but the improvement afforded by the taper occurs at a critical place and has made the difference between failure and success in providing flow control for household appliances used in places where the pressure of the water supply may become low.

It may be seen from the foregoing that we have provided a simple form of flow control device, which by the simple expedient of tapering the flow control orifice through the device attains far superior flow characteristic over former flow control devices in which there is no taper to the wall of the orifice, and that this superiority in flow control has enabled the flow control to conform to flow control requirements that could not be met by the flow control of curve "A."

It will be understood that modifications and variations of the present invention may be effected without departing from the spirit and scope of the novel concepts thereof.

We claim as our invention:

In a flow control device, a housing having a passageway leading therethrough, a seat in said passageway having a flow passageway leading therethrough, a resilient disc-like annular flow control device having a generally concave face on the downstream side thereof seating against said seat, the inner margin of said annular flow control device defining a straight-line flow orifice of less cross sectional area than the cross sectional area of the passageway through said seat and tapering outwardly from the upstream to the downstream end thereof when said flow control device is in an unstressed condition, whereby an accurate control of the flow through said flow orifice is attained at exceedingly low pressure ranges as well as at high pressure ranges.

References Cited in the file of this patent
UNITED STATES PATENTS

| | | |
|---|---|---|
| 2,454,929 | Kempton | Nov. 30, 1948 |
| 2,464,917 | Babson | Mar. 22, 1949 |
| 2,572,244 | Chase | Oct. 23, 1951 |
| 2,728,355 | Dahl | Dec. 27, 1955 |
| 2,781,058 | Warbus | Feb. 12, 1957 |